(12) United States Patent
Kleine et al.

(10) Patent No.: US 11,565,306 B2
(45) Date of Patent: Jan. 31, 2023

(54) CONNECTING ELEMENT, METHOD AND APPARATUS FOR ITS PRODUCTION

(71) Applicant: Mac Panther Gmbh, Bremen (DE)

(72) Inventors: Michael Kleine, Achim (DE); Andreas Kleine, Bremen (DE)

(73) Assignee: Mac Panther Gmbh

( * ) Notice: Subject to any disclaimer, the term of this patent is extended or adjusted under 35 U.S.C. 154(b) by 215 days.

(21) Appl. No.: 16/657,081

(22) Filed: Oct. 18, 2019

(65) Prior Publication Data

US 2020/0122214 A1    Apr. 23, 2020

(30) Foreign Application Priority Data

Oct. 19, 2018   (DE) .......................... 102018126086.5

(51) Int. Cl.
*B21D 17/02*   (2006.01)
*B21D 41/04*   (2006.01)
(Continued)

(52) U.S. Cl.
CPC ................ *B21J 5/12* (2013.01); *B21D 17/02* (2013.01); *B21D 41/04* (2013.01); *B21K 5/10* (2013.01)

(58) Field of Classification Search
CPC ... B21K 1/44; B21K 1/54; B21K 5/02; B21K 5/10; B21J 5/12; B21J 7/145; B21J 7/16;
(Continued)

(56) References Cited

U.S. PATENT DOCUMENTS 2,405,298 A    8/1946   Fleischer
3,555,935 A *  1/1971   Dorrenberg ............. B23P 15/32
                                                  29/423

(Continued)

FOREIGN PATENT DOCUMENTS

CN    1699785 A    11/2005
CN    1707135 A    12/2005
(Continued)

OTHER PUBLICATIONS

Definition of "die", https://www.google.com/search?q=define+die&rlz=1C1GCEB_enUS785US786&oq=define+die&aqs=chrome.69i57j0i433i512j0i512l3j0i10i512j0i512l4.2232j1j1&sourceid=chrome&ie=UTF-8 (Year: 2022).*
(Continued)

*Primary Examiner* — Shelley M Self
*Assistant Examiner* — Jared O Brown
(74) *Attorney, Agent, or Firm* — Merek, Blackmon & Voorhees, LLC (57) ABSTRACT

The invention relates to a method for producing a rod- or pipe-shaped connecting element (100, 100') having an end face (106) from a semi-finished connecting element (102) made of metal, in particular of a drill or chisel insertion end which is secured in an axially movable manner in a chuck of a hammer drill, a semi-finished connecting element (102) is provided, characterized in that at least one radially movable forming body (206) guided in the recesses (204) of a die (202) for forming at least one longitudinal groove (122, 124) closed on both sides in the semi-finished connecting element (102) has a smaller longitudinal extension (LR) than a planned length (L) of the longitudinal groove (122, 124) and that the forming of the at least one longitudinal groove (122, 124) closed on both sides in the semi-finished connecting element (102) is performed by radially applying the at least one forming body (206) and by subsequently axially shifting the semi-finished connecting element (102) in a longitudinal die opening (214) of the die (202).

7 Claims, 9 Drawing Sheets

(51) Int. Cl.
  *B21K 5/10* (2006.01)
  *B21J 5/12* (2006.01)
(58) Field of Classification Search
  CPC ......... B21J 9/06; B21J 13/025; B21C 23/001;
   B21C 23/147; B21D 17/02
  See application file for complete search history.

(56) References Cited

U.S. PATENT DOCUMENTS

| | | | | |
|---|---|---|---|---|
| 5,557,962 | A * | 9/1996 | Takikawa | B21C 23/14 72/260 |
| 6,290,439 | B1 * | 9/2001 | Bludis | B21J 9/00 408/227 |
| 11,027,327 | B2 | 6/2021 | Kleine et al. | |
| 2011/0290079 | A1 | 12/2011 | Schuetz et al. | |
| 2019/0262879 | A1 * | 8/2019 | Ben Amor | B21K 5/04 |

FOREIGN PATENT DOCUMENTS

| | | | | |
|---|---|---|---|---|
| CN | 103317081 | A | 9/2013 | |
| CN | 104249129 | A | 12/2014 | |
| CN | 107199254 | A | 9/2017 | |
| DE | 1527470 | A1 * | 8/1969 | ............... B21K 5/04 |
| DE | 3015893 | | 10/1981 | |
| DE | 4122158 | A1 * | 1/1993 | ............... B21J 9/04 |
| DE | 19915303 | | 10/1999 | |
| DE | 19859885 | | 11/1999 | |
| DE | 102004014705 | A1 * | 10/2005 | ............... B21K 5/16 |
| DE | 102010014477 | | 10/2011 | |
| DE | 102010018791 | | 11/2011 | |
| DE | 102010028474 | | 11/2011 | |
| EP | 2361702 | | 8/2011 | |
| EP | 2458131 | | 5/2012 | |
| EP | 2641673 | | 9/2013 | |
| EP | 2641673 | A2 | 9/2013 | |
| EP | 2839900 | | 2/2015 | |
| EP | 2839900 | A1 * | 2/2015 | ............... B21K 5/10 |
| GB | 631438 | | 11/1949 | |
| GB | 631438 | A * | 11/1949 | |
| GB | 657586 | A * | 9/1951 | ............... B21J 7/145 |
| WO | WO2011137021 | A1 | 11/2011 | |

OTHER PUBLICATIONS

European Search Report dated Mar. 23, 2020 issued in connection with European Application No. 19198953.2, eight pages.
German Search Report dated Jul. 29, 2019 issued in DE 102018126086.5, seven pages.
German Search Report dated Jul. 8, 2019 issued in DE 102018126093.8, seven pages.
U.S. Appl. No. 16/657,128, filed Oct. 18, 2019 and entitled "Method And Apparatus For Producing A Connecting Element".
European Search Report dated Mar. 13, 2020 issued in connection with European Application No. 19198941.7, six pages.
Chinese Office Action dated Jul. 28, 2022 issued in corresponding Chinese application No. 201910994854.9, eleven (11) pages.
Machine generated translation of Chinese Office Action dated Jul. 28, 2022 issued in corresponding Chinese application No. 201910994854.9, eleven (11) pages.
Machine generated translation of CN104249129 Dec. 31, 2014.
Machine generated translation of CN1699785A Nov. 23, 2005.
Machine generated translation of EP2641673A2 Sep. 25, 2013.

* cited by examiner

DETAIL A
SCALE 2:1  FIG. 4

FIG. 2

CROSS SECTION C-C  FIG. 6
SCALE 2:1

CROSS SECTION B-B
SCALE 2:1

CONNECTING ELEMENT, METHOD AND APPARATUS FOR ITS PRODUCTION

RELATED APPLICATION

The subject patent application claims priority under 35 USC § 119 from German application DE 102018126086.5 filed on Oct. 19, 2018. The entire contents of German application DE 102018126086.5 is incorporated herein by reference.

The invention relates to a method for producing a rod- or pipe-shaped connecting element provided with an end face and made from a metal semi-finished connecting element, in particular a drill or chisel insertion end secured in an axially movable manner in a chuck of a hammer drill. The invention further relates to such a connecting element and an apparatus for producing a connecting element from a semi-finished connecting element, in particular a drill or chisel insertion end that is secured in an axially movable manner in a chuck of a hammer drill.

Methods and apparatuses of the type initially mentioned are known from the prior art. For example, EP 2 458 131 A2, EP 2 361 702 A1, and EP 2 839 900 A1 show methods and apparatuses of the type initially mentioned.

A task of the present invention is to improve methods and/or apparatuses of the type initially mentioned.

This task is solved by the subject of the independent method claim 1 and/or, respectively, by the subject of the independent apparatus claim 11.

The present invention comprises the recognition that the methods known from the initially mentioned prior art are disadvantageous. In particular, the invention has recognized that, in the prior art of EP 2 839 900 A1, longitudinal grooves closed on both sides are formed by means of radially movable forming bodies by using forming bodies each of whose length corresponds to the respective length of the longitudinal groove to be formed. In this context, the present invention has recognized that for producing a commercial drill using the above-mentioned method of the prior art, about 80 tonnes of compression force are necessary in order to press the forming bodies in the drill's semi-finished product. This results in quite substantial, undesirable excess stress on the dies, and overall on the machine equipped with the dies. In addition, the machine must, in the first place, have been designed for such enormous forming forces. These machines are, however, accordingly expensive, and also slow.

One advantage of the present invention lies, in particular, in the fact that, due to the reduction of a longitudinal extension of the radially movable forming body guided in the die for forming the longitudinal groove to a dimension that is smaller than the longitudinal extension of the desired longitudinal groove when measured in parallel, significantly lower forces are required for the radial plunging of the at least one forming body. In this context, longitudinal extension is understood as the longitudinal extension in the direction of the longitudinal axis of the semi-finished connecting element. Here, the longitudinal extension of the forming body is essentially independent of the length of the longitudinal groove closed on both sides. The longitudinal extension of the forming body is preferentially selected depending on the force to be applied for axially shifting the element, which force in turn is essentially determined by the width and the depth of the longitudinal groove. Here, the invention has determined, e.g., that the necessary forces for the radial plunging of the at least one forming body into the semi-finished connecting element is only about 12 tonnes anymore. At the same time, the invention has determined that, due to the subsequent axial shifting according to the invention of the semi-finished connecting element in a longitudinal die opening of the die for creating and/or completing the at least one longitudinal groove, also only requires low shifting forces. For instance, the invention has determined that axially shifting the connecting element for the purpose of creating or completing the longitudinal groove only requires about 14 tonnes. After the planned length of the longitudinal groove has been reached, the shifting process is interrupted and the radially applied forming body is retracted radially again. Overall, the present invention thus advantageously makes it possible that significantly lower forces are required, which advantageously results in significantly smaller and simpler machines sufficing, and also in significantly lower die wear and thus, in overall lower cost for producing corresponding connecting elements.

A preferred embodiment of the invention is characterized by the fact that the longitudinal extension of the at least one radially movable forming body preferably is one to three times the width measured laterally to its longitudinal extension of the at least one longitudinal groove closed on both sides. Here, the longitudinal extension of the forming body is essentially independent of the length of the longitudinal groove closed on both sides. The longitudinal extension of the forming body is preferably selected depending on the force to be applied for axially shifting the element, which force is, in turn, determined essentially by the width and the depth of the longitudinal groove.

A preferred embodiment of the invention is characterized by the fact that the die has an interior contour corresponding to at least one planned rotary entrainment surface of the connecting element, and this at least one rotary entrainment surface is formed by forced insertion of the semi-finished connecting element into the die in the direction of a longitudinal axis of the semi-finished connecting element, and that the at least one longitudinal groove closed on both sides is embossed in the semi-finished connecting element by radially applying the at least one forming body movable within the die and by subsequent axial movement in the semi-finished connecting element in the direction of the longitudinal axis of the die. Here it is particularly advantageous that only a single die suffices for producing both the rotary entrainment surfaces and the longitudinal grooves. At the same time, this requires only a low level of forming forces since the rotary entrainment areas are also formed by forced insertion of the semi-finished connecting element in the die in the direction of the longitudinal axis of the die. This embodiment thus further develops the idea according to the invention of reducing the radially required forming forces by the fact that a part of the work of creating the longitudinal groove and/or the rotary entrainment surface is performed by axially sliding the semi-finished connecting element in a longitudinal die opening of the die.

A preferred embodiment of the invention is characterized by the fact that the embossing of the at least one or multiple longitudinal grooves closed on both sides is performed during the forming of the at least one rotary entrainment surface, preferably by the at least one radially movable forming body being axially offset relative to the longitudinal die axis from a front end of at least one of the forming elements arranged within the die for the at least one rotary entrainment surface. By selecting the offset to match the existing proportions, simultaneous forming of the rotary entrainment surface and of the longitudinal grooves closed on both sides can be performed in one continuous longitudinal movement without intermediate stops, which significantly simplifies the control of the forming machine.

A preferred embodiment of the invention is characterized by the fact that the embossing of the at least one longitudinal groove closed on both sides begins after the completion of the forming of the at least one rotary entrainment surface with the radial application of the at least one movable forming body, and is continued and/or completed by expelling the semi-finished connecting element from the longitudinal die opening under an axially acting force. This embodiment has the additional advantage that, during the insertion of the semi-finished connecting element in the die, only the force for forming the at least one rotary entrainment surface and during the expulsion only the force for forming the at least one longitudinal groove closed on both sides is required so that in this embodiment, the total required axial force is cut approximately in half. This way, in this embodiment, the load on the dies and also overall on the machine will be further reduced. Moreover, at the same time and particularly advantageously, this allows a short cycle time during production of the connecting elements according to the invention, so that overall the production speed is advantageously increased. In addition, this also advantageously performs a recalibration of the rotary entrainment surfaces formed previously.

A preferred embodiment of the invention is characterized by the fact that for a pipe-shaped semi-finished connecting element having an interior pipe cavity with an interior pipe diameter in the area of the at least one planned rotary entrainment surface and the at least one planned longitudinal groove closed on both sides, the interior pipe diameter is reduced or closed by creating the rotary entrainment surfaces; further preferably or alternatively the interior pipe diameter is reduced or closed by prior insertion of an interior pin profiled along its longitudinal axis by changes in its cross-section.

In this context, the invention has recognized that pipe-shaped semi-finished connecting elements having an interior cavity in the pipe with an interior pipe diameter are primarily used to produce hollow drill bits. Such hollow drill bits are preferably produced from solid steel rods. The interior cavity in the pipe with an internal pipe diameter, which creates the actual hollow bore, is preferably created by drilling deep holes. In this context, the invention has recognized that this drilling of deep holes is not only very expensive, but that it also has disadvantages in terms of quality due to the frequently occurring scoring at the bottom of the borehole. This frequently results in scrap, so that the price of hollow drill bits produced in this manner is very high, which is an obstacle to the general spread of such hollow drill bits. Using, according to the invention, a pipe-shaped semi-finished connecting element, e.g., a preferably thick-walled pipe section, avoids these disadvantages according to the invention. In particular, in this embodiment of the invention, preferably the rear end of the drill is closed off, so that the impact energy can be transmitted to this solid rear end and at the same time, the extraction process with a hollow drill bit produced according to this embodiment continues to take place, as is also known in hollow drill bits known from the prior art, upstream from the insertion end.

A preferred embodiment of the invention is characterized by the fact that the die is divided at least once in the longitudinal direction and the halves or parts of the die have a small distance from each other relative to the diameter of the connecting elements during ejection. The advantages of this embodiment lie, in particular, in the fact that, due to the slight, i.e. small relative to a diameter of a connecting element, distance between the die halves created by dividing the die in its longitudinal direction, the forces required for expelling the connecting element from the die are reduced.

The present invention also claims protection for a semi-finished connecting element, in particular a drill and chisel semi-finished product, having at least one rotary entrainment surface and having at least one longitudinal groove closed on both sides, produced by means of a method according to the invention, in particular by means of a method according to the invention according to one of the preferred embodiments described above.

The present invention further claims protection for a connecting element, in particular for a drill or chisel, having at least one rotary entrainment surface and having at least one longitudinal groove closed on both sides, produced by means of a method according to the invention, in particular by means of a method according to the invention according to one of the preferred embodiments described above.

A preferred embodiment of the apparatus according to the invention for producing the connecting element is characterized by the fact that an additional die and an extrusion punch acting in a longitudinal die opening of the die are provided for forming at least one rotary entrainment surface in the semi-finished connecting element.

Another preferred embodiment of the production apparatus according to the invention is characterized by the fact that on both sides, as an extension of the longitudinal die opening, one punch each is arranged; a first extrusion punch is for forming the at least one rotary entrainment surface during insertion of the semi-finished connecting element in the die, and a second extrusion punch on an ejector side that is arranged opposite the first punch for forming the at least one longitudinal groove of the connecting element closed on both sides during expulsion of the semi-finished connecting element from the die. This embodiment of the production apparatus according to the invention constitutes a particularly economical and technologically simple embodiment since this apparatus has suitable extrusion punches on both sides of the die for moving the semi-finished connecting element within the die, whereby during insertion of the semi-finished connecting element in the die and also during expulsion or ejection of the semi-finished connecting element from the die, forming processes can be performed on the semi-finished connecting element for producing the desired connecting element.

Another preferred embodiment of the production apparatus according to the invention is characterized by the fact that outside of the die and preferably approximately perpendicular to the longitudinal die opening, at least one wedge is arranged that presses upon the at least one radially movable forming body for embossing the longitudinal grooves closed on both sides. An advantage of this preferred arrangement of the wedges lies, in particular, in the fact that this provides a particularly compact execution of the production apparatus according to the invention.

Another preferred embodiment of the production apparatus according to the invention is characterized by the fact that the at least one wedge is attached as an interior cam surface within a bushing rotatably supported concentrically to the die, and that, by turning the bushing, the force for forming the longitudinal grooves closed on both sides is applied to the at least one radially movable forming body. An advantage of this preferred embodiment of the apparatus according to the invention lies in particular in the fact that that this arrangement of the bushing rotatably supported concentrically to the die provides a particularly compact execution of the production apparatus according to the invention.

Additional preferred embodiments of the invention are listed in the dependent claims.

Below, preferred embodiments of the invention are described based on the drawings. Parts or method steps that are identical or have identical functions are identified by the same reference symbols. The drawings show the following.

Figure 1:
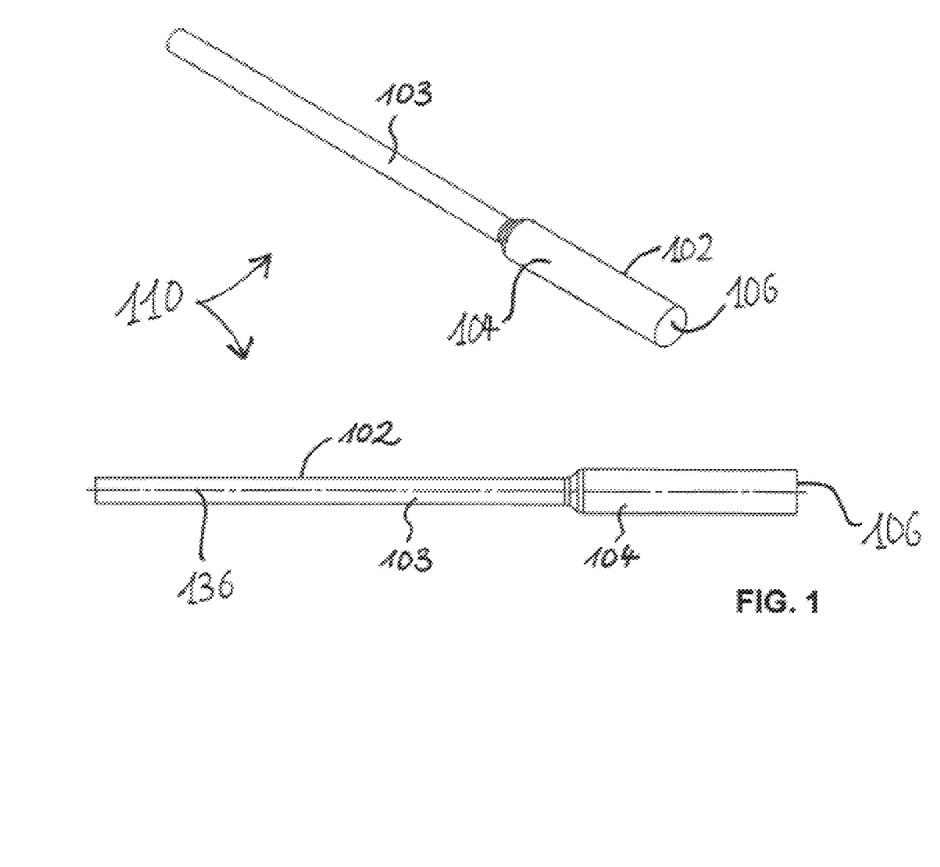
FIG. 1 shows a semi-finished connecting element for use in the methods and/or apparatuses according to the invention in a perspective view and a side view.
Figure 17:
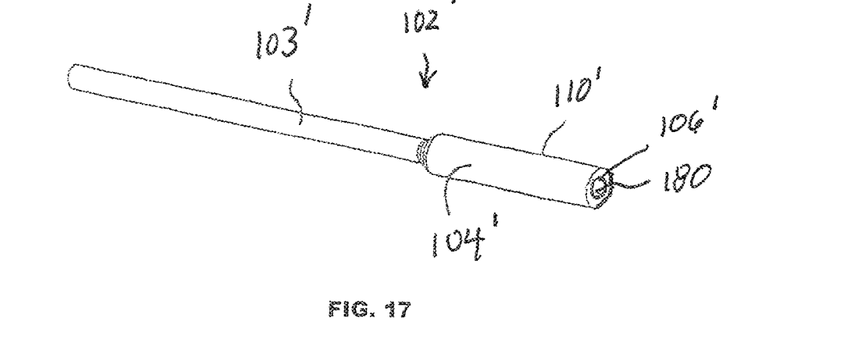
FIG. 17 shows a pipe-shaped semi-finished connecting element for use in the methods and/or apparatuses according to the invention in a perspective view.

FIG. 1 shows a semi-finished connecting element 102 for use in the methods and/or apparatuses according to the invention in a perspective view and in a side view. The semi-finished connecting element 102 shown in FIG. 1 is made of metal. The semi-finished connecting element 102 is overall embodied as a cylindrical rod. Alternatively, as shown in FIG. 17, the semi-finished connecting element can be a cylindrical piped-shape connecting element 102' having a hollow interior cavity 180 extending the length or substantially the length of connecting element 102'. The semi-finished product 102 has a section 103 having a smaller diameter, always shown on the left in FIG. 1, and a section 104, always shown on the right in FIG. 1, which has, when compared to the diameter of the section 103, a diameter that is roughly twice as large, wherein the difference in diameters between the sections 103 and 104 are irrelevant for the present invention. In addition, the semi-finished product 102 has at its side facing away from the thinner section 103 an end face 106. FIG. 1 shows the raw state 110 of the semi-finished product 102 before the embossing of a longitudinal groove or a rotary entrainment surface in the section 104. The dashed line 136 visible in FIG. 1 in the side view of the semi-finished product 102 shows the longitudinal axis of the semi-finished product 102.

The semi-finished product 102', as shown in FIG. 17, has a section 103' having a smaller diameter, always shown on the left in FIG. 17, and a section 104', always shown on the right in FIG. 17, which has, when compared to the diameter of the section 103', a diameter that is roughly twice as large, wherein the difference in diameters between the sections 103' and 104' are irrelevant for the present invention. In addition, the semi-finished product 102' has at its side facing away from the thinner section 103' an end face 106'. FIG. 17 shows the raw state 110' of the semi-finished product 102' before the embossing of a longitudinal groove or a rotary entrainment surface in the section 104' using any of the methods or apparatuses described herein.

The semi-finished connecting element 102' of FIG. 17 is embodied as a pipe-shaped semi-finished product 102'. An internal pipe cavity 180 with a desired internal pipe diameter which extends concentrically with the longitudinal axis of element 102' can be found in the semi-finished product 102'. Such semi-finished products are used, e.g., in hollow drill bits.

Figures 2, 4:
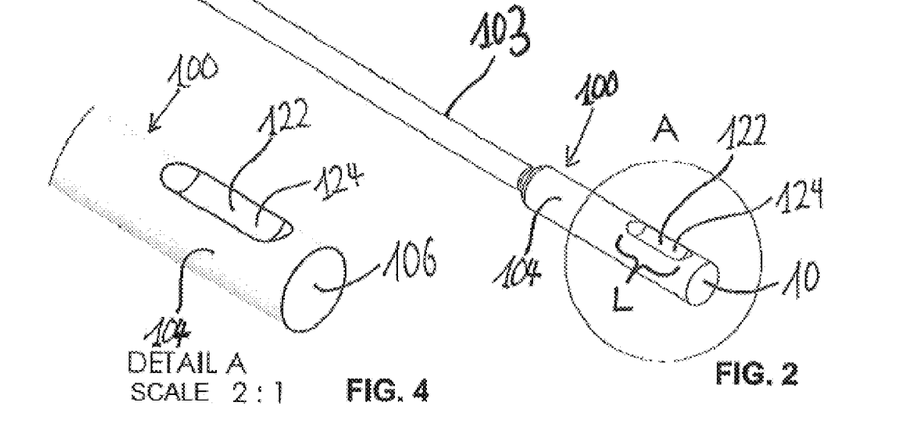
FIG. 2 shows a perspective view of a connecting element according to a first embodiment of the invention.
FIG. 4 shows the detail view A of FIG. 2.

FIG. 2 shows a perspective view of a connecting element according to a first embodiment of the invention. FIG. 2 shows in the area of the section 104 a metal rod-shaped connecting element 100 made of the semi-finished connecting element 102 of FIG. 1 and provided with an end face 106. The first embodiment of the connecting-element 100 according to the invention shown in FIG. 2 represents a drill or chisel insertion end secured in an axially movable manner in a chuck of a hammer drill. The connecting element 100, which is located in the cylindrical section 104, and which is described in more detail with reference to FIGS. 4-7, has two longitudinal grooves closed on both sides 122 across from each other on the circumference of the section 104. The longitudinal grooves 122 have a planned length L. In the embodiment shown, the longitudinal grooves 122 serve as the locking grooves 124.

Figures 3, 8:
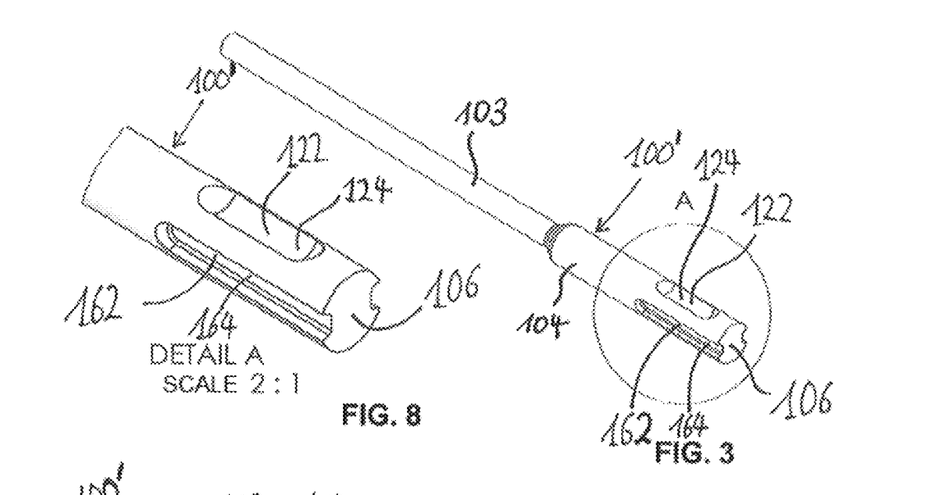
FIG. 3 shows a perspective view of a connecting element according to a second embodiment of the invention.
FIG. 8 shows the detail view A of the second embodiment of the connecting element according to FIG. 3.

FIG. 3 shows a perspective view of a connecting element according to a second embodiment of the invention. The second embodiment of a connecting element 100' according to the invention shown in FIG. 3 is described in more detail below with reference to FIGS. 8-11. The essential difference between the second embodiment of the connecting element 100' and the connecting element 100 of FIGS. 2 and 4-7 is that two rotary entrainment surfaces 164—separated by a right angle from the longitudinal grooves 122 along the circumferential direction of the circumference of the section 104—two rotary entrainment surfaces 164 also located on the circumference of the section 104 across from each other, which are open towards the end face 106, embodied essentially as U-shaped grooves 162 in the depicted embodiment of FIGS. 3 and 8-11, are formed and/or embossed.

FIG. 4 shows the detail view A of FIG. 2.

Figure 5:
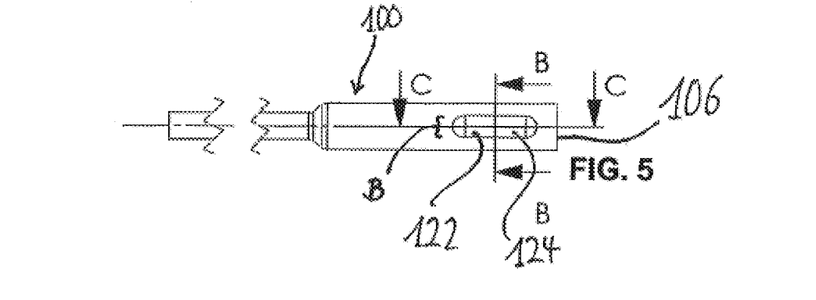
FIG. 5 shows a partial top view of the connecting element of FIG. 2.

FIG. 5 shows a top view of the connecting element 100 of FIG. 2.

Figure 6:
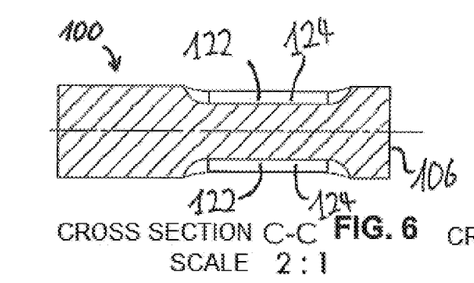
FIG. 6 shows a sectional view according to the sectional line C-C shown in FIG. 5.

FIG. 6 shows a sectional view of the connecting element 100 according to the sectional line C-C shown in FIG. 5.

Figure 7:
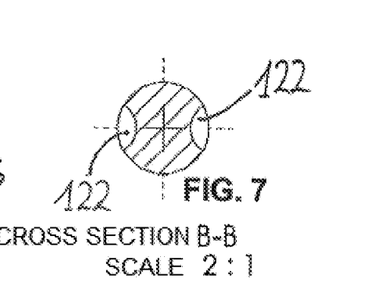
FIG. 7 shows a sectional view according to the sectional line B-B shown in FIG. 5.

FIG. 7 shows a sectional view of the connecting element 100 according to the sectional line B-B shown in FIG. 5.

FIG. 8 shows detail view A of the second embodiment of the connecting element 100' according to FIG. 3.

Figure 9:
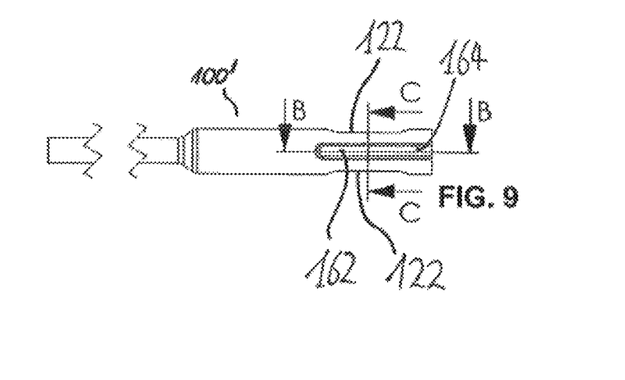
FIG. 9 shows a partial top view of the connecting element of the second embodiment according to FIG. 3.

FIG. 9 shows a partial top view of the connecting element 100' of the second embodiment according to FIG. 3.

Figure 10:
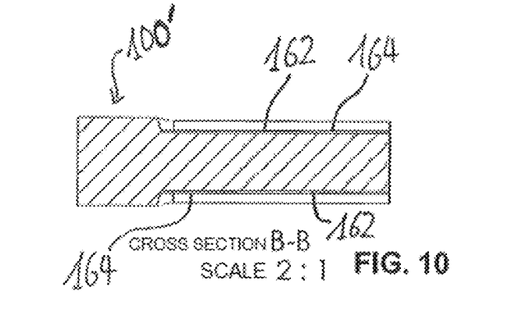
FIG. 10 shows a sectional view according to the sectional line B-B shown in FIG. 9.

FIG. 10 shows a sectional view of the connecting element 100' according to the sectional line B-B shown in FIG. 9.

Figure 11:
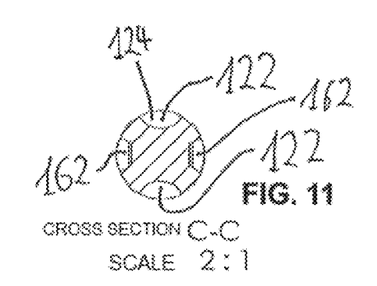
FIG. 11 shows a sectional view according to the sectional line C-C shown in FIG. 9.

FIG. 11 shows a sectional view of the connecting element 100' according to the sectional line C-C shown in FIG. 9.

Figure 12:
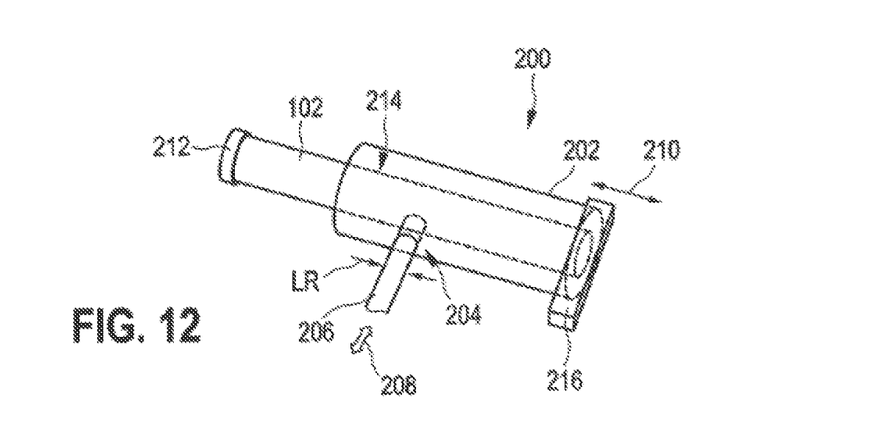
FIG. 12 shows a first embodiment of an apparatus according to the invention for producing a connecting element from a semi-finished connecting element.

FIG. 12 shows a first embodiment of an apparatus 200 according to the invention for producing a connecting element 100 from a semi-finished connecting element 102, in particular for producing a drill or chisel insertion end secured in an axially movable manner in a chuck of a hammer drill. Apparatus 200 has a die 202 with an interior contour. The interior contour corresponds to at least one planned rotary entrainment surface 162 of the connecting element 100'. The die 202 has one at least radially movable forming body 206 arranged in a recess 204 of the die 202. In the shown embodiment of FIG. 12, the forming body 206 is embodied as a rounded groove punch that can be radially applied and reset according to the double arrows 208 in the direction of the semi-finished connecting element 102. The rounded groove punch 206 serving as a forming body is used for forming at least one longitudinal groove 122 closed on both sides in the semi-finished product 102. A length LR measured along a parallel to the longitudinal axis of the semi-finished product 102 and/or, respectively, along a parallel to the double arrow 210 of FIG. 12 is smaller than the planned length L of the longitudinal groove 122 according to FIG. 2. In the exemplary embodiment shown in FIG. 12, the length LR of the rounded groove punch 206 corresponds to the diameter of the rounded groove punch 206 since the latter has a circular cross-section. Preferably, the diameter LR of the rounded groove punch 206 and/or, respectively, the length LR of the forming body 206 measured along a parallel to the arrow 210 is roughly between one and three times the width of the longitudinal groove 122 and less than 30% of the planned length L of the longitudinal groove 122 according to FIG. 2.

The forming of a longitudinal groove 122 according to FIG. 2 in the semi-finished product 102 is performed using the apparatus 200 of FIG. 12 by radially applying the forming body 206 and subsequently axially shifting the semi-finished connecting element 102 in a longitudinal die opening 214, which is matched to the outer circumference of the semi-finished product 102, of the die 202 according to the arrow 210. The longitudinal extension LR of the rounded groove punch 206 serving as a radially movable forming body is preferably one to three times that of a width B of the longitudinal groove 122 closed on both sides, which is shown in FIG. 5. In the exemplary embodiment shown in FIG. 12, the longitudinal extension LR of the rounded groove punch 206 corresponds to the width B of the planned longitudinal groove 122.

The apparatus 200 of FIG. 12 shows, for performing the shifting, an extrusion punch 212 acting in a longitudinal direction of the die 202 arranged by the double arrow 210 and an extrusion punch 216. The extrusion punch 212 is used for forming the rotary entrainment surface 164 during the insertion of the semi-finished connecting element 102 in the die 202; the extrusion punch 216 is used subsequently for forming the longitudinal groove 122 closed on both sides and for ejecting the semi-finished connecting element 102 from the die 202. By means of the extrusion punch 216 and the rounded groove punch 206, at least one longitudinal groove 122 closed on both sides can be formed in the semi-finished connecting element 102 by embossing. For this purpose, essentially, the radially movable rounded groove punch 206 is applied perpendicularly in the direction of the circumferential surface of the semi-finished connecting element 102 until the rounded groove punch 206 plunges into the circumferential surface of the semi-finished connecting element 102 to the desired depth of, in this case, 2.4 mm. Upon reaching the desired depth, this radial movement of the rounded groove punch 206 directed at the semi-finished connecting element 102 according to the arrow 208, is stopped. Then the extrusion punch 216 begins to expel the semi-finished connecting element 102 from the die 202 according to the end of the double arrow 210, shown in FIG. 12 on the right, in order to move the rounded groove punch, which has already plunged into the semi-finished connecting element 102, relative to the semi-finished product 102 and to thus form a longitudinal groove in the circumferential surface of the semi-finished product 102. The longitudinal groove then has a longitudinal extension corresponding to the sum of the circumference of the rounded groove punch 206 and the length of the shift of the punch 216 in the die 202.

Figure 13:
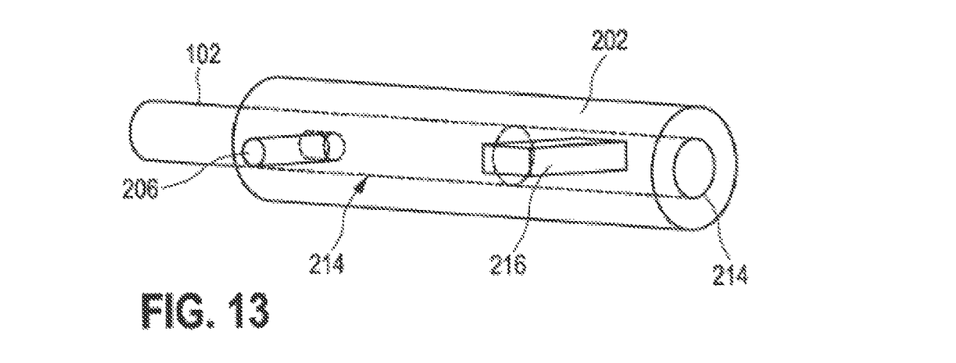
FIG. 13 shows the embodiment of FIG. 12 at a later point in time.

FIG. 13 shows the apparatus of FIG. 12 from a different perspective and immediately before the start of the expulsion of the semi-finished product 102 from the longitudinal die opening 214 by the extrusion punch 216.

Figure 21:
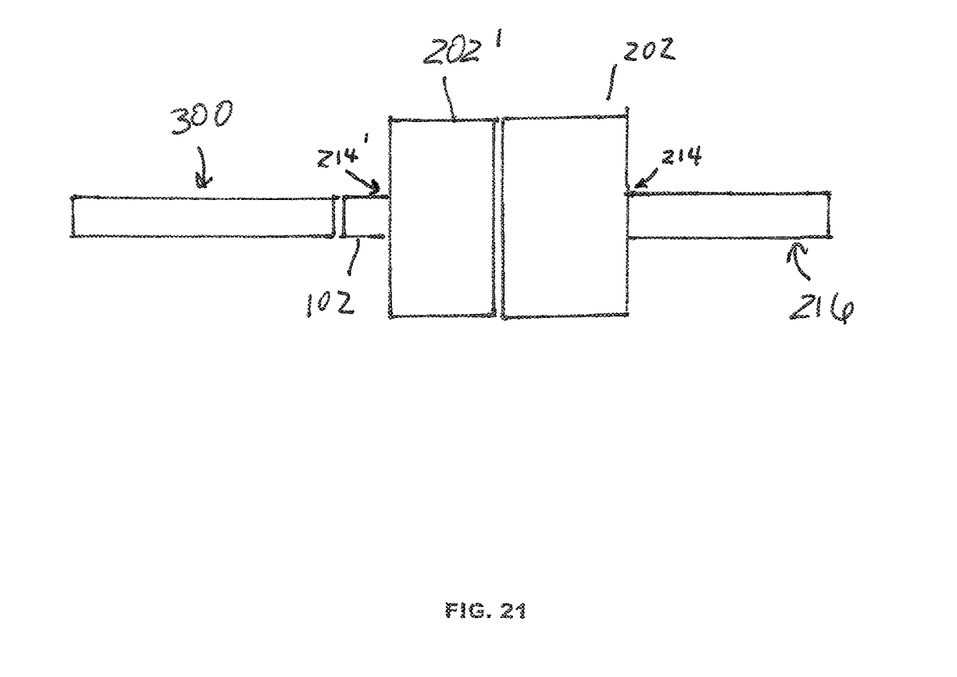
FIG. 21 is a schematic view of a second embodiment of an apparatus according to the invention for producing a connecting element from a semi-finished connecting element having first and second dies and first and second extrusion punches.

In a second embodiment of the apparatus according to the invention shown in FIG. 21, an additional, second die 202' having an extrusion punch 300 acting in this die's longitudinal die opening 214' can be provided for forming at least one rotary entrainment surface 162 in the semi-finished connecting element 102. This embodiment is characterized by the fact that extrusion punch 300 is arranged as an extension of each of the two longitudinal die openings 214 and 214'. A first extrusion punch 300 is provided for forming the at least one rotary entrainment surface 162 in the semi-finished connecting element 102 during insertion in the second die 202', and a second extrusion punch 216 is provided for forming the at least one longitudinal groove 122 closed on both sides in the semi-finished connecting element 102 during the insertion in the die 202.

Figure 14:
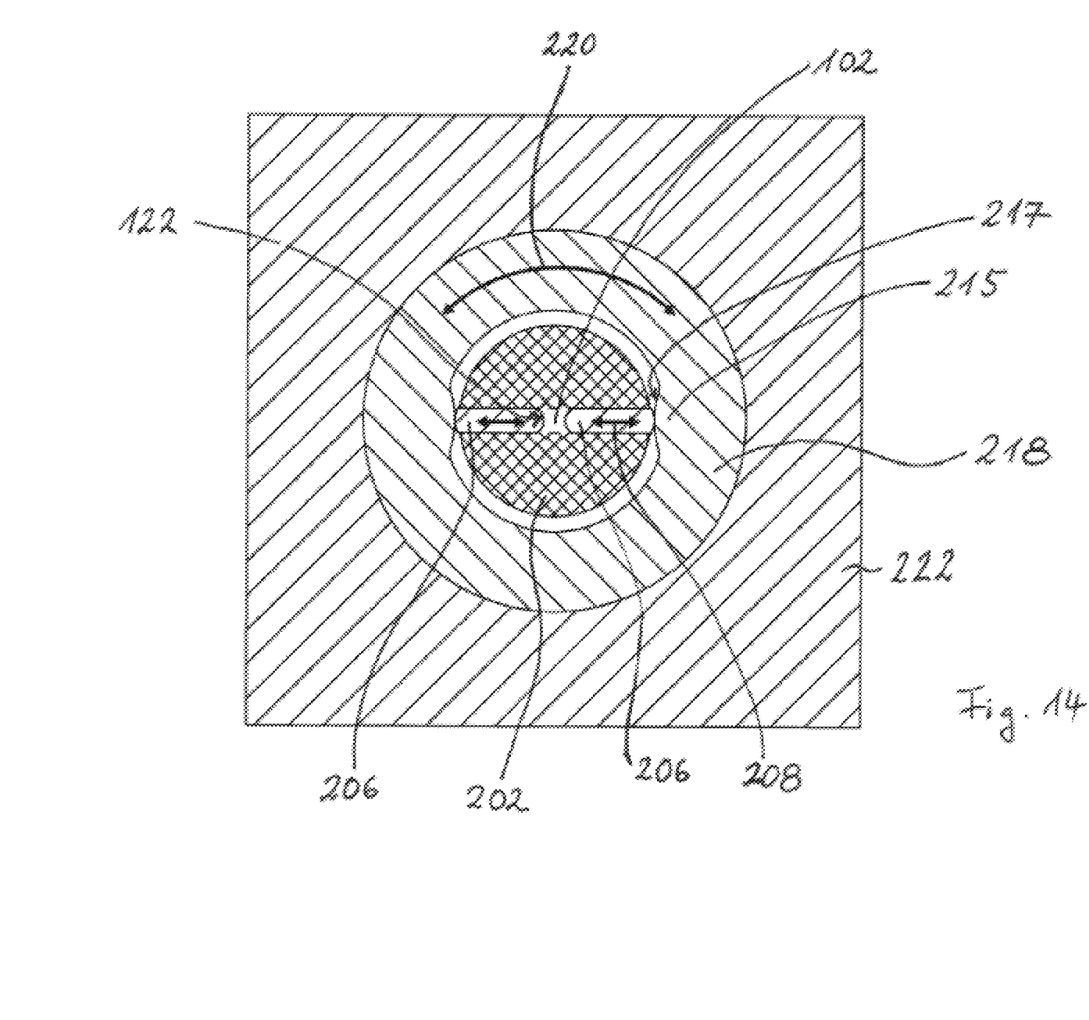
FIG. 14 shows a cross-section of a third embodiment of an apparatus according to the invention for producing a connecting element from a semi-finished connecting element.
Figure 15:
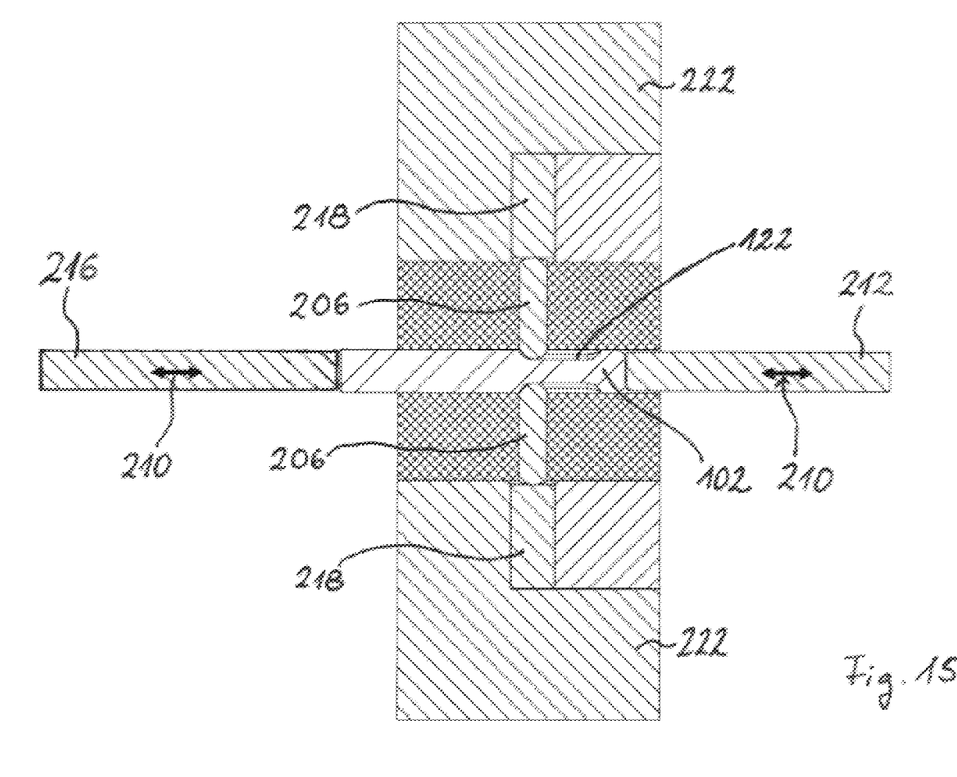
FIG. 15 shows a longitudinal section of the embodiment of FIG. 14.
Figure 16:
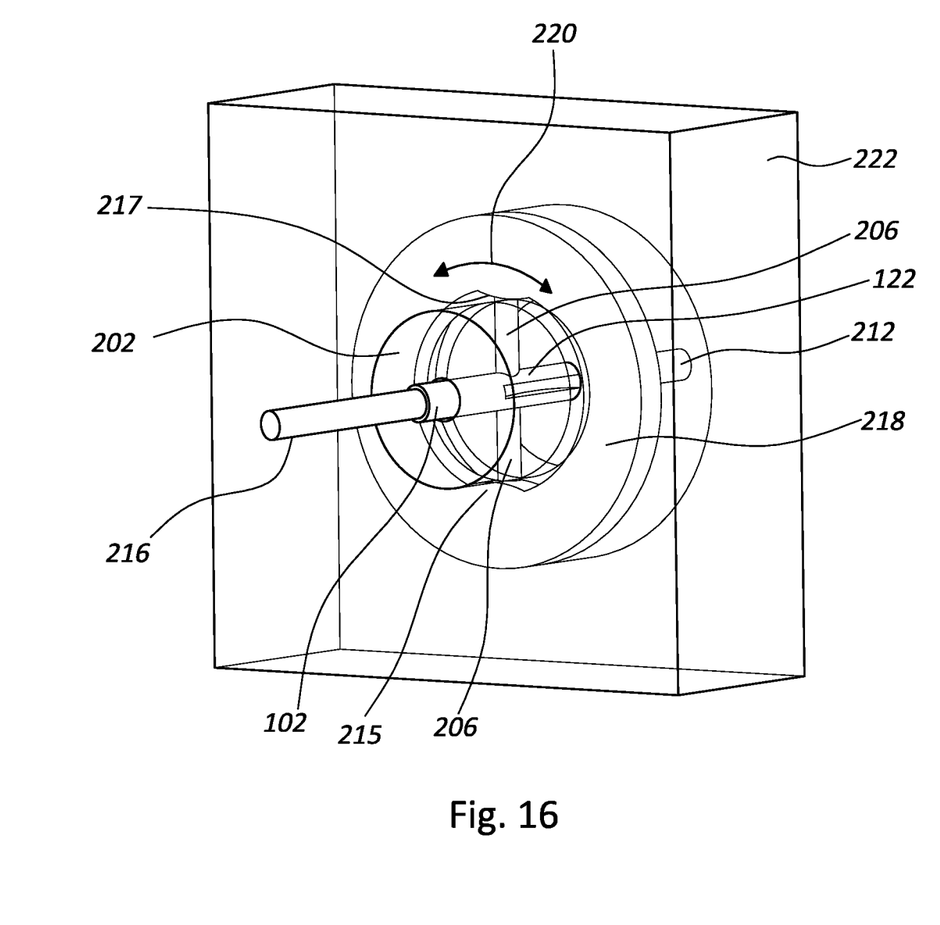
FIG. 16 shows a perspective view of the embodiment of FIG. 14.

A third embodiment is shown in FIGS. 14-16. FIG. 14 shows a cross-section, FIG. 15 shows a longitudinal section, and FIG. 16 shows a perspective view of this embodiment. The embodiment of FIGS. 14-16 is characterized by the fact that outside of the die 202 and approximately perpendicular to the longitudinal die opening 214, at least one wedge 215 is arranged that, for embossing the at least one longitudinal groove 122 closed on both sides in the semi-finished connecting element 102 presses upon the at least one radially movable forming body 206 according to the double arrow 208. This embodiment is, according to FIGS. 14-16, further characterized by the fact that the at least one wedge 215 is attached as an interior cam surface 217 inside a bushing 218 rotatably supported concentrically to the die 202 in a bearing 222, and that by rotating the bushing 218 according to the double arrow 220, the force for forming the at least one longitudinal groove 122 closed on both sides is applied to the at least one radially movable forming body 206. FIGS. 14-16 show a state in which the forming bodies 206 have formed the longitudinal grooves 122 closed on both sides, and retraction of the forming bodies 206 from the grooves 122 is imminent by the rotating bushing 218 according to the double arrow 220 in a corresponding manner so that the cams 217 lose contact with the ends of the forming bodies 206 facing the cams 217.

Another, fourth embodiment, which is not shown, of the apparatus according to the invention and/or the method according to the invention is characterized by the fact that the die 202 has an interior contour corresponding to at least one planned rotary entrainment surface 162 of the connecting element 100' and that this at least one rotary entrainment surface 162 is formed by forced insertion of the semi-finished connecting element 102 in the die 202 in the direction of a longitudinal axis 210 of the die 202, and the at least one longitudinal groove 122 closed on both sides is embossed by radially applying the at least one forming body 206 movable in the die 202 and subsequent axial movement in the direction of the longitudinal axis 210 of the die 202. This embodiment can be further developed by performing the embossing of the at least one longitudinal groove 122 closed on both sides subsequent to the forming of the at least one rotary entrainment surface 162.

The method according to the invention can be characterized by the fact that the embossing of the at least one longitudinal groove closed on both sides is performed during the forming of the at least one rotary entrainment surface 162, preferably by the at least one radially movable forming body 206 being axially offset relative to a longitudinal die axis 210 from a front end of the at least one forming element 206, which is arranged in the die 202, for the at least one rotary entrainment surface 162.

The method according to the invention can further be characterized by the fact that the embossing of the at least one longitudinal groove closed on both sides begins upon completion of the forming of the at least one rotary entrainment surface 162 by the radial application of the at least one movable forming body 206 and is continued and/or completed by expelling the semi-finished connecting element 102 from the longitudinal die opening 214 under an axially acting force.

Figure 18:
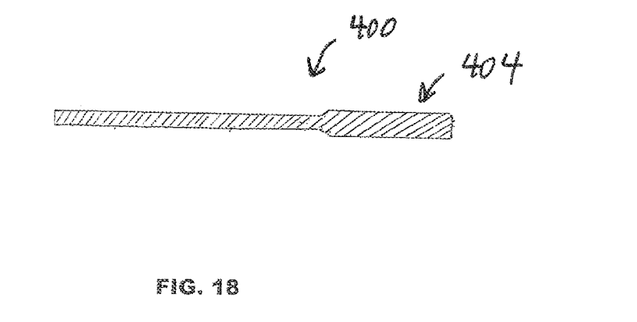
FIG. 18 shows a cross-sectional view of an interior pin taken along a longitudinal axis of an interior pin having a cylindrical shape.
Figure 19:
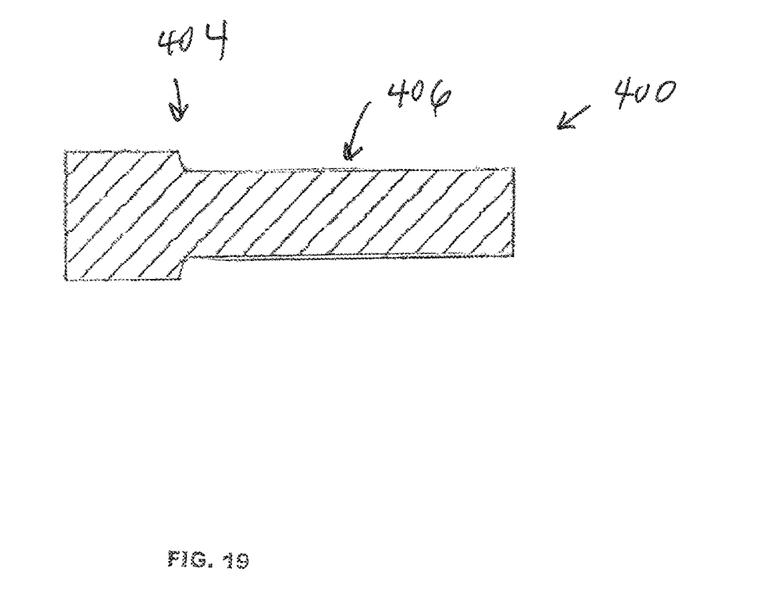
FIG. 19 shows a portion of a right end of the interior pin having an annular recess.

The method according to the invention can further be characterized by the fact that in a pipe-shaped semi-finished connecting element 102' having an interior pipe cavity 180 with an interior pipe diameter, interior pipe diameter is decreased or closed in the area of the at least one planned rotary entrainment surface 162 and the at least one planned longitudinal groove 122 by forming the at least one rotary entrainment surface 162 and/or the at least longitudinal groove using any of the methods described herein; further preferably or alternatively, the interior pipe diameter of element 102' is reduced or closed after an interior pin 400 profiled along its longitudinal axis by changes in its cross-section, is inserted in interior pipe cavity 180 in the semi-finished connecting element 102'. In particular, the left end of interior pin 400 is initially inserted into the right end of interior pipe cavity 180 of element 102' and subsequently pushed into place in the interior of pipe cavity 180 so that the opposing ends of pin 400 are generally vertically aligned with the opposing ends of connecting element 102'. Pin 400 has a shape similar to the shape of interior cavity 180 of element 102' but is smaller in size than the size of interior cavity 180 so that pin 400 can be disposed in interior cavity 180. Preferably, pin 400 has one or more recessed portions radially aligned or substantially radially aligned with the planned at least one groove and/or the planned at least one rotary entrainment surface wherein the recessed portion or portions provide sufficient space between the corresponding portion or portions of the section 404 of pin 400 and the corresponding portions of section 104' of element 102' to allow the at least one rotary entrainment surface and/or the at least one groove closed at both ends to be formed in section 104' of element 102'. Referring to FIG. 18, for example, a portion of pin 400 (e.g., section 404) is shown as having an annular recess 406 that allows the at least one rotary entrainment surface and/or the at least one groove closed at both ends to be formed in section 104' of element 102' using any of the methods and/or apparatuses described herein.

Figure 20:
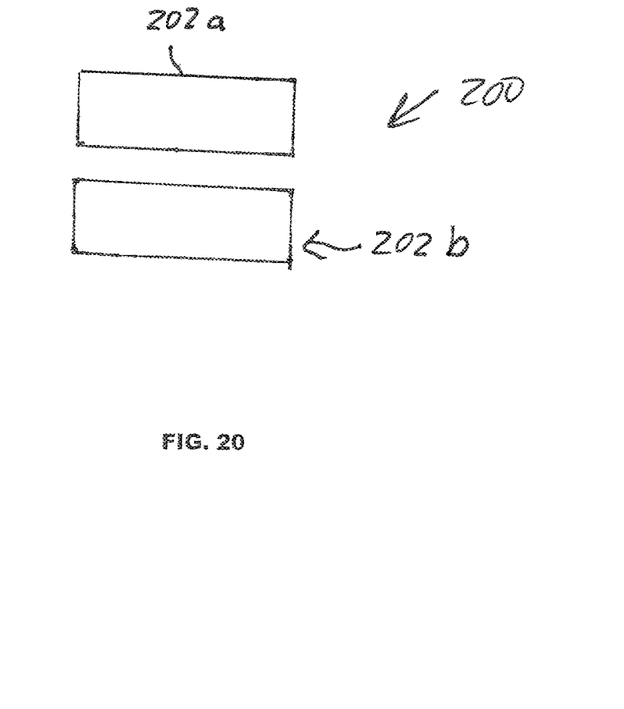
FIG. 20 is a schematic view of a die having two halves or parts.

The method according to the invention can be further characterized by the fact that the die 202 is divided at least once in its longitudinal direction 210, and the die halves or parts have at the time of, preferably just before, the expulsion a slight distance between them, relative to a diameter of the connecting element 100, 100'. Referring to FIG. 20, a die 202 having two die parts or halves 202a and 202b are shown.

The invention claimed is:

1. An apparatus for producing a connecting element from a semi-finished connecting element, wherein the connecting element is a drill or chisel insertion end secured in an axially movable manner in a chuck of a hammer drill, comprising:
a die,
at least one radially movable forming body configured to be guided in at least one recess of the die and configured to form at least one longitudinal groove in the semi-finished connecting element, wherein the longitudinal groove is closed at both ends, the at least one radially movable forming body has a smaller longitudinal extension than a length of the at least one longitudinal groove to be formed in the semi-finished connecting element,
a first extrusion punch and a second extrusion punch, said first extrusion punch and said second extrusion punch being configured to axially shift the semi-finished connecting element in the die in opposing directions along a longitudinal axis of said die, and,
wherein the apparatus is configured to form the at least one longitudinal groove by radially plunging the at least one radially movable forming body into the semi-finished connecting element and subsequently axially shifting the semi-finished connecting element in a longitudinal die opening of the die while the at least one radially movable forming body is radially plunged into the semi-finished connecting element.

2. The apparatus according to claim 1, further comprising: an additional die and one of said first extrusion punch and said second extrusion punch is configured to act in a longitudinal die opening of one of the die and/or the additional die for forming at least one rotary entrainment surface in the semi-finished connecting element.

3. The apparatus according to claim 1, wherein the first extrusion punch is arranged on one side of the longitudinal die opening and configured to axially shift the semi-finished connecting element in the die so that at least one rotary entrainment surface in the semi-finished connecting element is formed upon insertion of the semi-finished connecting element in the die, and the second extrusion punch is arranged on an ejection side located opposite the first extrusion punch and configured to axially shift the semi-finished connecting element when the at least one radially movable forming body is applied to the semi-finished connecting element to form the at least one longitudinal groove closed on both sides in the semi-finished connecting element upon expulsion from the die.

4. The apparatus according to claim 1, wherein outside of the die and approximately perpendicular to the longitudinal die opening at least one wedge is arranged that is configured to press on the at least one radially movable forming body for embossing the at least one longitudinal groove on the semi-finished connecting element.

5. The apparatus according to claim 4, wherein the at least one wedge is attached as an interior cam surface in a bushing rotatably supported concentrically to the die and, by rotating the bushing, a force for forming the at least one longitudinal groove is applied to the at least one radially movable forming body.

6. The apparatus according to claim 1, wherein the at least one recess of the die includes at least one radially extending opening to guide movement of the at least one radially movable forming body, said at least one radially extending opening communicates with said longitudinal die opening and extends outwardly from said longitudinal die opening.

7. The apparatus according to claim 1, wherein the at least one longitudinal groove is formed in an exterior surface of the semi-finished connecting element.

\* \* \* \* \*

UNITED STATES PATENT AND TRADEMARK OFFICE
CERTIFICATE OF CORRECTION

| | |
|---|---|
| PATENT NO. | : 11,565,306 B2 |
| APPLICATION NO. | : 16/657081 |
| DATED | : January 31, 2023 |
| INVENTOR(S) | : Michael Kleine and Andreas Kleine |

It is certified that error appears in the above-identified patent and that said Letters Patent is hereby corrected as shown below:

In the Claims

Column 10, Claim 3, Line 66 the phrase "closed on both sides" has been deleted.

Signed and Sealed this
Twenty-fifth Day of April, 2023

*Katherine Kelly Vidal*

Katherine Kelly Vidal
*Director of the United States Patent and Trademark Office*